United States Patent
Puetz et al.

(10) Patent No.: US 6,533,694 B1
(45) Date of Patent: Mar. 18, 2003

(54) HYDRO MECHANICAL TRANSMISSION PLANETARY CARRIER SUPPORT SYSTEM

(75) Inventors: Craig Alan Puetz, Waterloo, IA (US); Douglas Rene Johnson, Waterloo, IA (US); Ulrich Otten, Speyer (DE)

(73) Assignee: Deere & Company, Moline, IL (US)

( * ) Notice: Subject to any disclaimer, the term of this patent is extended or adjusted under 35 U.S.C. 154(b) by 82 days.

(21) Appl. No.: 09/669,757

(22) Filed: Sep. 26, 2000

(51) Int. Cl.⁷ .......................... F16H 57/08; F16H 47/04
(52) U.S. Cl. ........................................... 475/72; 475/346
(58) Field of Search .......................... 475/72, 346, 347

(56) References Cited

U.S. PATENT DOCUMENTS 4,934,216 A * 6/1990 Sandel et al. .................. 475/59
5,248,283 A * 9/1993 Eckhardt et al. ............... 475/72
5,761,959 A   6/1998 Winter ........................ 74/15.66

* cited by examiner

Primary Examiner—Dirk Wright

(57) ABSTRACT

In a hydro-mechanical transmission having a hydrostatic unit and a mechanical gear train, the hydrostatic unit is resiliently mounted in the transmission housing to reduce the transmission of noise and vibration to the housing. Movement of the hydrostatic unit is facilitated by mounting the planetary carrier on a ball bearing instead of taper roller bearings. The ball bearing allows the carrier limited movement transverse to the axis of rotation of the carrier. To further reduce wear of the gear faces, one or more of the meshing gears at the point of relative movement have crowned gear faces rather than straight gear faces. This avoids a single line of contact of the meshing teeth at the tooth edge.

4 Claims, 1 Drawing Sheet

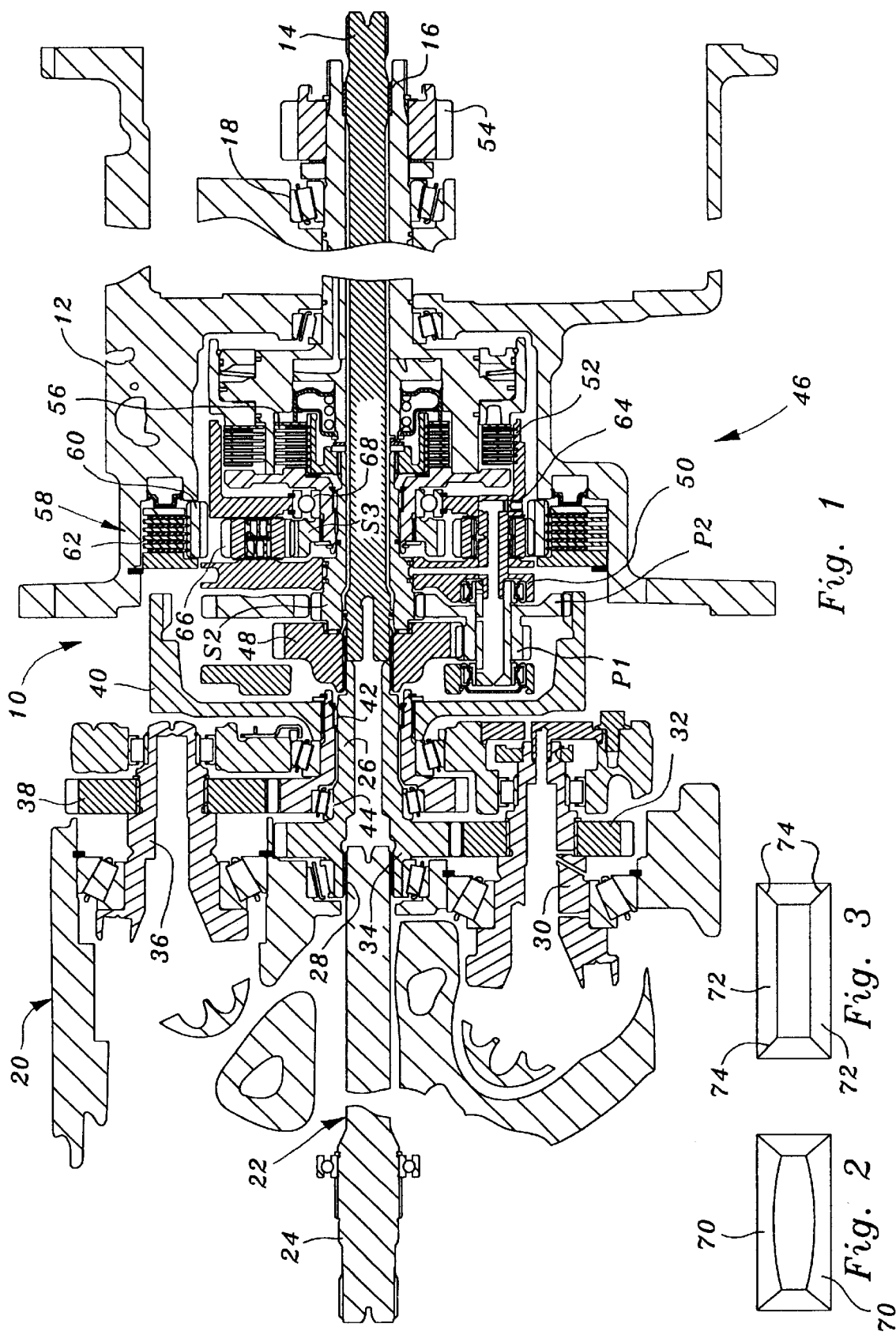

HYDRO MECHANICAL TRANSMISSION PLANETARY CARRIER SUPPORT SYSTEM

BACKGROUND OF THE INVENTION

1. Field of the Invention

The present invention relates to a hydro-mechanical transmission having a hydrostatic unit and a mechanical portion including a planetary gear system and in particular to such a transmission having a ball bearing mounting the carrier of the planetary system to facilitate movement of the hydrostatic unit relative to the transmission housing and the mechanical portion.

2. Description of Related Art

In hydro-mechanical transmission having a mechanical portion and a hydrostatic unit, it is known to mount the hydrostatic unit within the transmission housing by an isolation mounting system. The isolation mounting system uses a resilient member, such as a rubber member, to isolate the hydrostatic unit from the housing. This reduces noise and vibration transmission from the hydrostatic unit to the transmission housing. The resilient member allows limited movement of the hydrostatic unit relative to the transmission housing. An example of such a mount is shown in U.S. Pat. No. 5,345,839 where rubber members 17b and 21a, FIGS. 3 and 4, are used to dampen noise and vibration from the hydrostatic unit. With the use of a resilient isolating mount for the hydrostatic unit, it is necessary to accommodate the movement of the hydrostatic unit in the mechanical portion of the transmission to avoid premature wear of the gear faces.

SUMMARY OF THE INVENTION

The present invention overcomes the problem of premature wear of the gear faces by providing the mechanical portion of the transmission with a planetary carrier that is mounted on a ball bearing instead of taper roller bearings. A ball bearing is typically manufactured with internal clearances to allow a small amount of misalignment. The ball bearing thus allows the carrier limited movement transverse to the axis of rotation of the carrier. To further reduce wear of the gear faces, one or more of the meshing gears at the point of relative movement have crowned gear faces rather than straight gear faces to avoid a single line of contact of the meshing teeth at the tooth edge.

DESCRIPTION OF THE DRAWINGS

FIG. 1 is a longitudinal sectional view of the hydro-mechanical transmission of the present invention.

FIG. 2 is a plan view of a crowned gear tooth.

FIG. 3 is a plan view of a straight gear tooth.

DESCRIPTION OF THE PREFERRED EMBODIMENT

The hydro-mechanical transmission having the planetary carrier support system of the present invention is shown in FIG. 1 and designated generally at 10. The transmission 10 includes a transmission housing 12 and a transmission shaft 14 rotatably mounted in the housing through a bushing 16 and a roller bearing 18. The transmission 10 further includes a hydrostatic unit 20 having a through shaft 22. The through shaft is shown having two portions, an input portion 24 and an output portion 26 connected to one another through a spline joint 28. The hydrostatic unit 20 is mounted to the housing 12 via a resilient isolating mount such as shown in the patent referenced above. The particular structure of the isolating mount is not relevant to the present invention other than the provision of a resilient or elastomeric material that allows limited movement of the hydrostatic unit 20 relative to the transmission housing 12.

The hydrostatic unit 20 includes a pump and motor driven from a hydrostatic unit input shaft 30. The shaft 30 is driven by a gear 32 that is in turn driven by the gear 34 integrally formed in the output portion 26 of the through shaft 22. The hydrostatic unit output shaft 36 drives a gear 38 that in turn drives a planetary ring gear 40. The ring gear 40 is rotatably carried on the output portion 26 of the through shaft 22 by needle bearing 42 and roller bearing 44.

The transmission further includes a planetary gear system 46 that includes the ring gear 40 previously mentioned. The planetary gear set 46 includes a sun gear 48 that surrounds and is splined to end portions of the hydrostatic unit through shaft 22 and the transmission shaft 14 thereby coupling the through shaft 22 to the transmission shaft 14. The sun gear 48 meshes with planet gears P1 which are integrally formed with planet gears P2. The planet gears P1, P2 are mounted to a planetary carrier 50. The planet gears P2 mesh with the ring gear 40 and a second sun gear S2.

The carrier 50 is coupled through a low speed clutch 52 to an output gear 54. The sun gear S2 is alternatively coupled to the output gear 54 through a high speed clutch 56. The output gear 54 drives an output shaft, not shown. The transmission shaft 14 is coupled to a power take drive in a known manner.

A reversing planetary gearset 58 has a ring gear 60 that can be selectively locked to the housing 12 through a reverse brake 62. The gearset 58 has a double planet set with planet gears 64 and 66. The planet gear 64 meshes with the ring gear 60 and the planet gear 66 meshes with a third sun gear S3. The planet gears 64, 66 are also carried by the planetary carrier 50. The sun gear S3 is fixed to the output gear 54. With the reverse brake engaged to stop the ring gear 60 and the two clutches 52 and 56 disengaged, the output gear 54 will rotate in the opposite direction for reverse.

Because the hydrostatic unit 20 can move relative to the transmission housing 12, the planetary carrier 50 is mounted in the transmission on a ball bearing 68. The ball bearing 68 allows the carrier to move with the hydrostatic unit by rotating about the ball bearing. The splined connection of the hydrostatic unit through shaft 22 and the transmission shaft 14 by the sun gear 48 is provided with free play to further facilitate the movement of the hydrostatic unit.

To prevent premature wear of the gear faces caused by this movement, the planet gear P2 has crowned teeth as shown in FIG. 2. The surfaces 70 of the gear teeth are curved. Likewise, the teeth of the sun gear 48 and planet gears P1 are also crowned. The curved crowned surfaces 70 allow the line of contact between the meshing teeth to move along the face of the teeth as the hydrostatic unit moves rather than producing a single line of contact at the edge or corners of the teeth as would be the case if the meshing gear faces were all straight. A straight tooth is shown in FIG. 3 with flat surfaces 72. With these flat surfaces, the corners 74 of the teeth would be the sole lines of contact between meshing teeth when the hydrostatic unit moved out of alignment with the remainder of the transmission.

The invention should not be limited to the above-described embodiment, but should be limited solely by the claims that follow.

We claim:

1. In a hydro-mechanical transmission having a transmission housing, a hydrostatic unit mounted in the transmission housing and allowed to move relative to the transmission housing, the transmission including a shaft rotatably mounted in the housing and a planetary gear system including a planet carrier coaxial with the transmission shaft and the hydrostatic unit including a through shaft coupled to the transmission shaft via a spline connection and a planetary ring gear rotatably supported on the through shaft and meshing with planet gears of the planetary system, the ring gear being driven by the hydrostatic unit, the improvement comprising free play in the spline connection and a ball bearing supporting the planetary carrier on the transmission shaft to facilitate the movement of the hydrostatic unit relative to the transmission housing.

2. The transmission as defined by claim 1 wherein the teeth of the planet gears meshing with the ring gear are crowned to reduce wear of the teeth induced by the movement of the hydrostatic unit relative to the transmission housing.

3. The transmission as defined by claim 1 wherein the through shaft of the hydrostatic unit is coupled to the transmission shaft through a sun gear of the planetary system that surrounds adjacent end portions of the through shaft and the transmission shaft and is splined to each of the through shaft and the transmission shaft.

4. The transmission as defined by claim 3 wherein the sun gear has teeth meshing with the teeth of planet gears and the meshing sun and planet gear teeth are crowned to reduce wear of the teeth induced by the movement of the hydrostatic unit relative to the transmission housing.

* * * * *